US011906139B1

(12) United States Patent
Xu

(10) Patent No.: US 11,906,139 B1
(45) Date of Patent: Feb. 20, 2024

(54) LAMP HEAD ASSEMBLY

(71) Applicant: JIANGMEN CITY SHENGDA LIGHTING CO., LTD., Jiangmen (CN)

(72) Inventor: Xiaojun Xu, Jiangmen (CN)

(73) Assignee: JIANGMEN CITY SHENGDA LIGHTING CO., LTD., Jiangmen (CN)

( * ) Notice: Subject to any disclaimer, the term of this patent is extended or adjusted under 35 U.S.C. 154(b) by 0 days.

(21) Appl. No.: 18/318,741

(22) Filed: May 17, 2023

(30) Foreign Application Priority Data

Mar. 17, 2023 (CN) ......................... 202320542028.2

(51) Int. Cl.

| | |
|---|---|
| ***F21V 17/06*** | (2006.01) |
| ***F21V 1/12*** | (2006.01) |
| ***F21V 19/00*** | (2006.01) |
| ***F21V 29/83*** | (2015.01) |

(52) U.S. Cl.

CPC ................ *F21V 17/06* (2013.01); *F21V 1/12* (2013.01); *F21V 19/0025* (2013.01); *F21V 19/0045* (2013.01); *F21V 29/83* (2015.01)

(58) Field of Classification Search

CPC . F21V 1/12; F21V 17/06; F21V 17/12; F21V 19/0025

See application file for complete search history.

(56) References Cited

U.S. PATENT DOCUMENTS

2023/0143898 A1* 5/2023 Xu ............................ F21S 4/10 362/217.14

* cited by examiner

*Primary Examiner* — Sean P Gramling

(57) ABSTRACT

A lamp head assembly includes a lamp holder, a light-emitting element, a first lampshade, and a second lampshade. A plug interface is disposed on the lamp holder for supplying power, and the light-emitting element is inserted into the plug interface. The first lampshade includes a first connecting port and a first accommodation cavity, the first connecting port is communicated with the first accommodation cavity, the first lampshade is connected to the lamp holder through the first connecting port, and the light-emitting element is located in the first accommodation cavity. The second lampshade includes an extension body and an abutting portion, and the abutting portion is connected to a first side of the extension body. The abutting portion abuts against the first connecting port, or, the abutting portion abuts against the lamp holder. The extension body extends from the abutting portion toward the first accommodation cavity.

9 Claims, 19 Drawing Sheets

A-A

LAMP HEAD ASSEMBLY

TECHNICAL FIELD

The present disclosure relates to a technical field of lighting fixtures, and in particular to a lamp head assembly.

BACKGROUND

Lamps refer to an appliance capable of transmitting light, distributing light of light sources, and changing the light distribution of the light sources, including all parts and components required for fixing and protecting the light sources except the light sources, and further including line accessories necessary for connecting to power supplies. The lamps enable the light sources to reliably emit light, so as to meet requirements for light when humans are engaged in various activities. Except for the light sources, modern electrical lamps each further includes an optical component, an electrical component, and a mechanical component.

In prior art, assembling the lamps generally includes assembling a lamp holder, an outer lampshade, an inner lampshade, and a light-emitting element. However, such assembling method of the lamps generally integrates the outer lampshade and the inner lampshade, thereby leading to relatively high design and production cost of lampshades. There is also a design of lamps having separate lamp holder, outer lampshade, and inner lampshade to be assembled together, the lamp holder and the outer lampshade, the lamp holder and the inner lampshade, or the outer lampshade and the inner lampshade need to be fastened and connected one by one, which is very inconvenient to assemble the lampshades or disassemble the lampshades for cleaning. In particular, there is also a centering position requirement between the light-emitting element, the inner lampshade, and the outer lampshade for better achieving a lighting effect. Therefore, it is necessary to provide a lamp head assembly to achieve convenience of assembling and disassembling the lamps and better lighting effect.

SUMMARY

The present disclosure aims to provide a lamp head assembly to achieve convenience of assembling and disassembling the lamps and better lighting effect.

In order to achieve above aims, the present disclosure provides a lamp head assembly, including a lamp holder, a light-emitting element, a first lampshade, and a second lampshade. A plug interface is disposed on the lamp holder for supplying power, and the light-emitting element is inserted into the plug interface. The first lampshade includes a first connecting port and a first accommodation cavity, the first connecting port is communicated with the first accommodation cavity, the first lampshade is connected to the lamp holder through the first connecting port, and the light-emitting element is located in the first accommodation cavity. The second lampshade includes an extension body and an abutting portion, and the abutting portion is connected to a first side of the extension body. The abutting portion abuts against the first connecting port, or, the abutting portion abuts against the lamp holder. The extension body extends from the abutting portion toward the first accommodation cavity, and light of the light-emitting element diffuses toward the first accommodation cavity through the extension body.

Furthermore, an outer diameter of the abutting portion is greater than an inner diameter of the first connecting port.

Furthermore, the extension body includes side walls, a second connecting port, and a second accommodation cavity, the side walls are enclosed to form the second accommodation cavity, the second connecting port is located at a second side of the extension body and is communicated with the second accommodation cavity, the side walls abut against the first lampshade through the first connecting port, and the light-emitting element enters the second accommodation cavity through the second connecting port.

Furthermore, heat dissipation grooves are defined in the side walls for heat of the light-emitting element to pass through.

Furthermore, the extension body further includes a top cover, the top cover is located at the second side of the extension body distal from the second connecting port, and is connected to the side walls. The top cover and the side walls form the second accommodation cavity, and the light-emitting element directly faces the top cover.

Furthermore, the top cover is recessed in the extension body from a direction of the first accommodation cavity toward a direction of the second accommodation cavity.

Furthermore, the extension body includes supporting legs and extension plates, the supporting legs are connected to the abutting portion and the extension plates, the light-emitting element abuts against one end of each of the extension plates close to the supporting legs, and the light of the light-emitting element diffuses toward the first accommodation cavity through the extension plates.

Furthermore, a plurality of light guide holes are defined on each of the extension plates.

Furthermore, at least two of the extension plates are connected to form an included angle.

Furthermore, a threaded hole is defined in the lamp holder, external threads are formed on a portion of the first lampshade close to the first connecting port, and the lamp holder is connected to the first lampshade through the external threads.

Furthermore, the plug interface is disposed in the threaded hole, the plug interface includes at least two connecting jacks, the light-emitting element includes connecting pins for matching the at least two connecting jacks.

Compared with the prior art, the present disclosure has following beneficial effects.

According to the lamp head assembly, since the first lampshade is connected to the lamp holder through the first connecting port, the second lampshade enables the first connecting port or the abutting portion to abut against the lamp holder through the abutting portion, so that the lamp holder, the first lampshade, and the second lampshade are conveniently and detachably connected. Moreover, since the abutting portion acts on the first connecting port or the lamp holder, so that the light-emitting element, the first lampshade, and the second lampshade are good coaxial, which solves technical problems in the prior art that the lamps are inconvenient to assembly and disassembly and do not provide an ideal lighting effect.

BRIEF DESCRIPTION OF DRAWINGS

In order to more clearly illustrate embodiments of the present disclosure or technical solutions in the prior art, the drawings that need to be used in the embodiments or the prior art are briefly described below, and it is obvious that the accompanying drawings in the following description are merely some embodiments of the present disclosure, and those who skilled in the art may obtain other drawings according to these drawings without involving any inventive effort.

DETAILED DESCRIPTION

Figure 1:
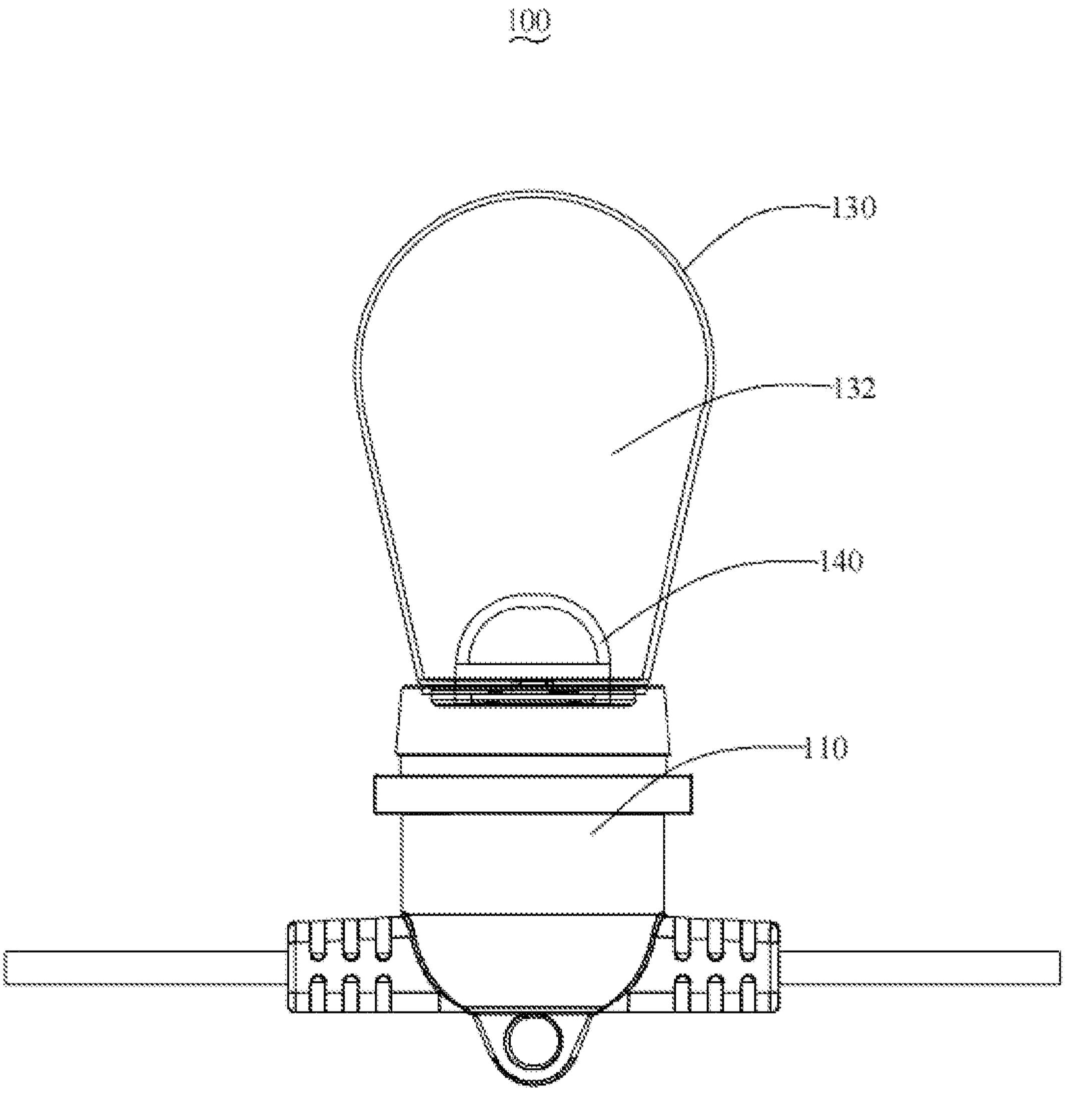
FIG. 1 is a visualizing structural schematic diagram of a lamp head assembly according to a first embodiment of the present disclosure.
Figure 2:
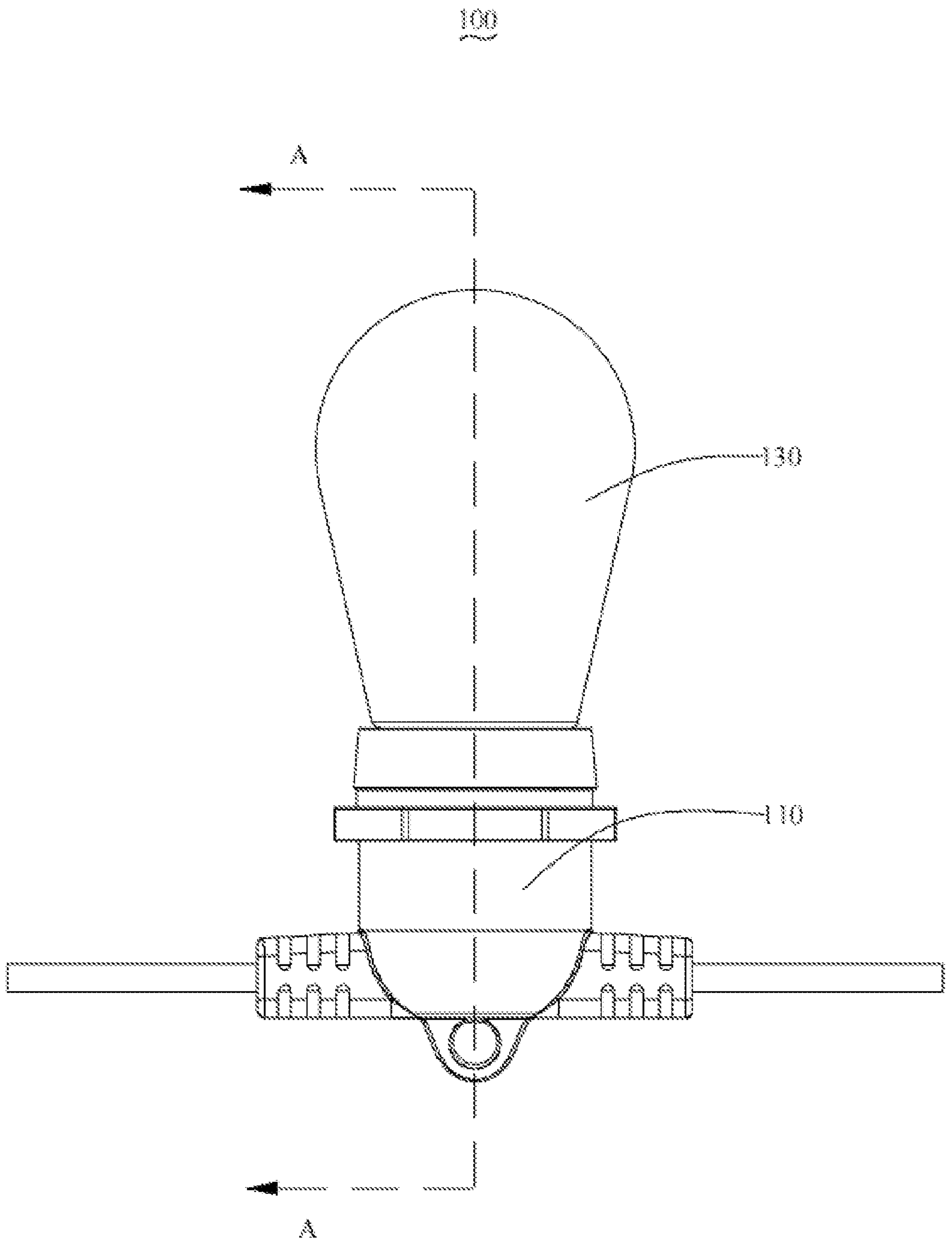
FIG. 2 is a structural schematic diagram of the lamp head assembly according to the first embodiment of the present disclosure.
Figure 3:
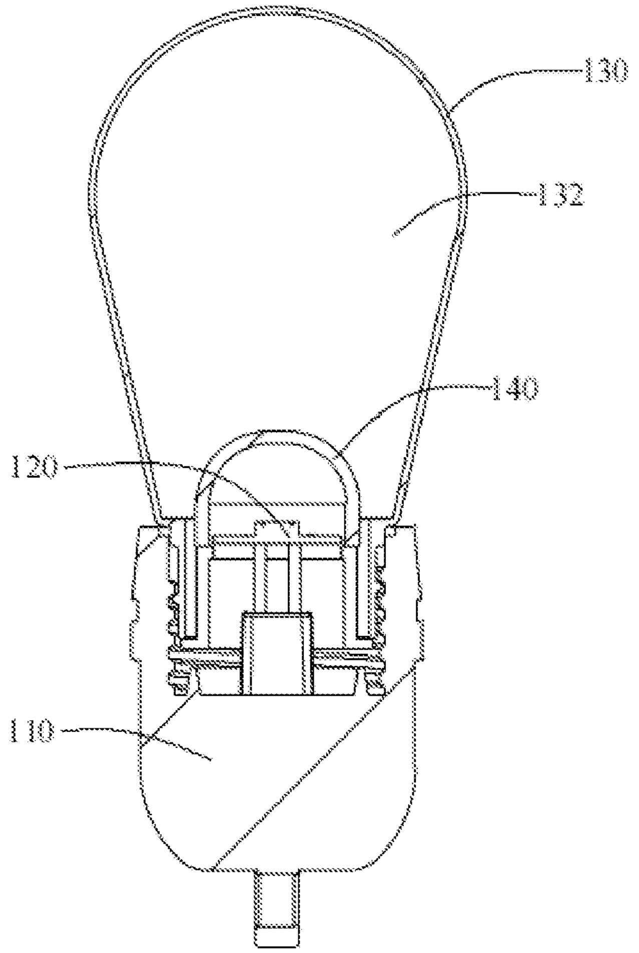
FIG. 3 is a cross-sectional view taken from the line A-A shown in FIG. 2.
Figure 4:
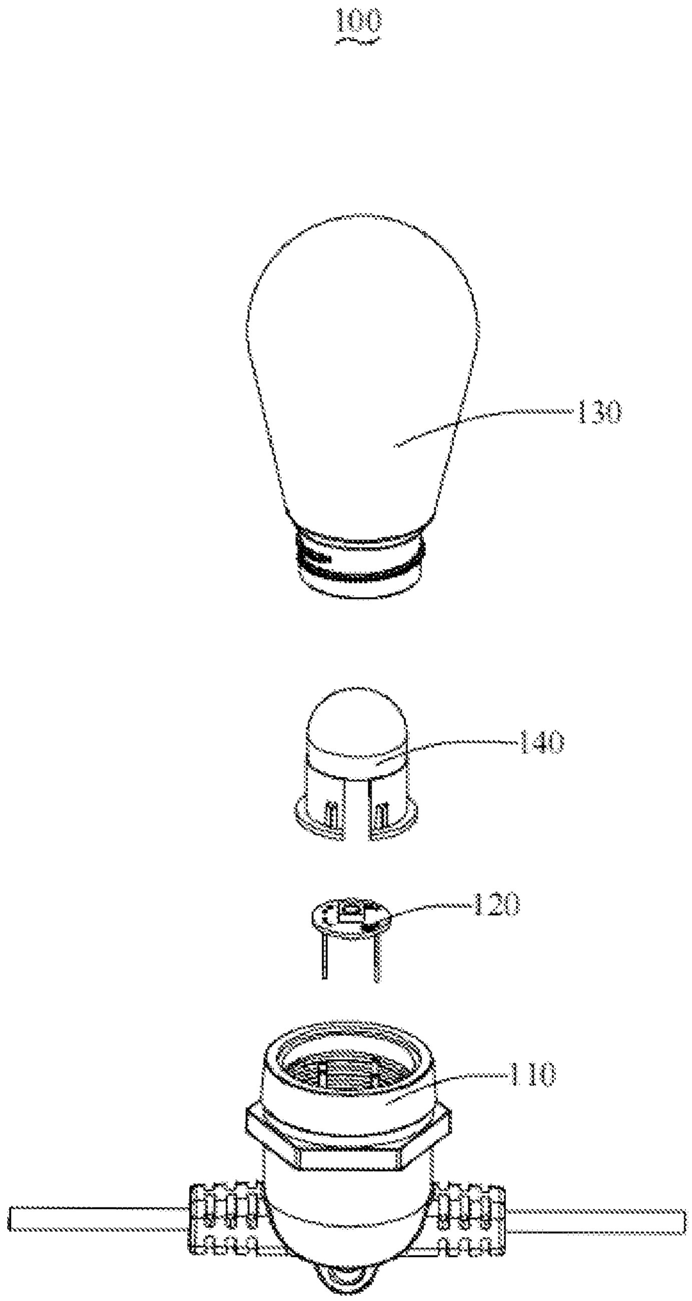
FIG. 4 is an exploded schematic diagram of the lamp head assembly.
Figure 5:
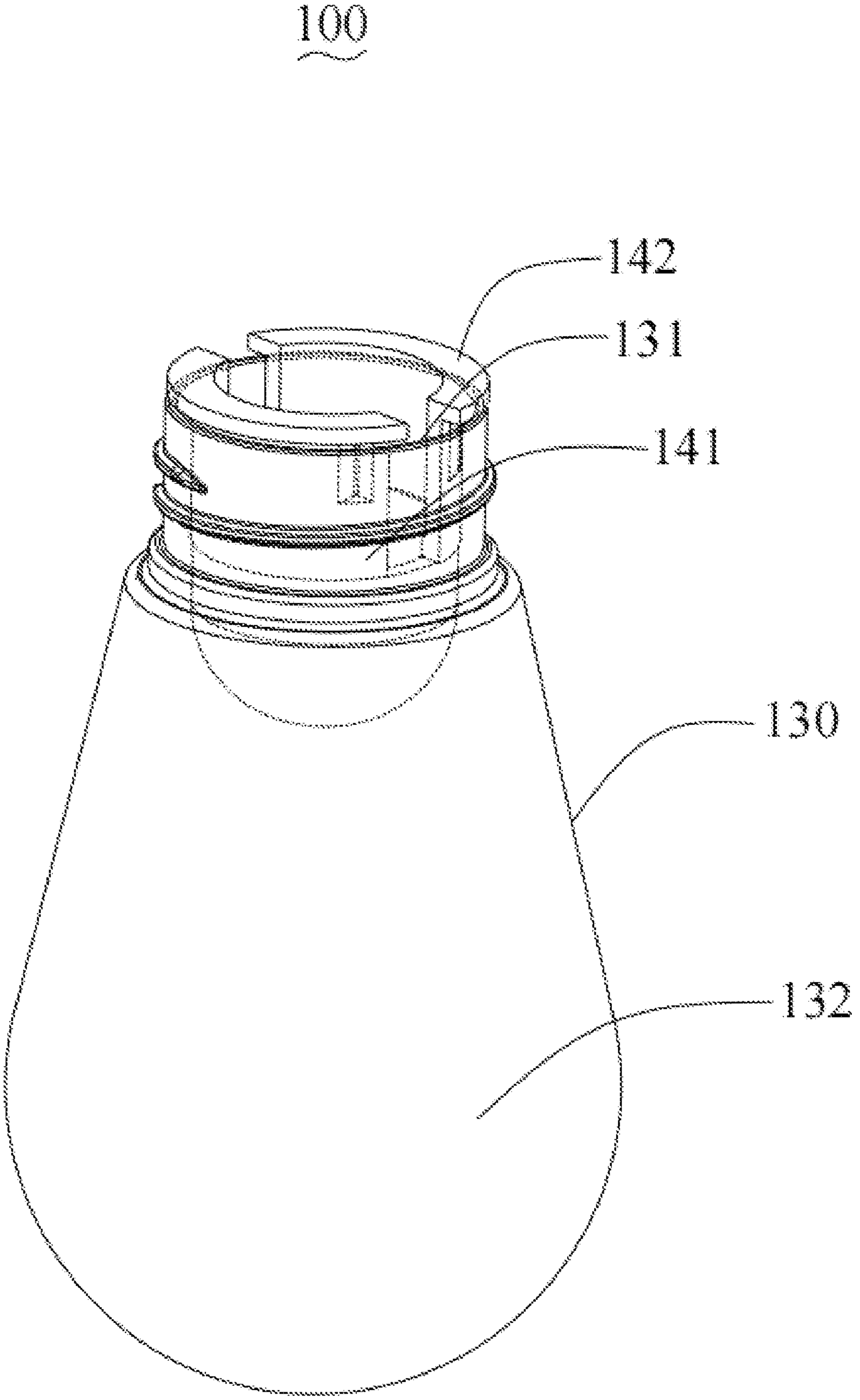
FIG. 5 is a structural schematic diagram of assembly of the first lampshade and the second lampshade according to the first embodiment of the present disclosure.
Figure 6:
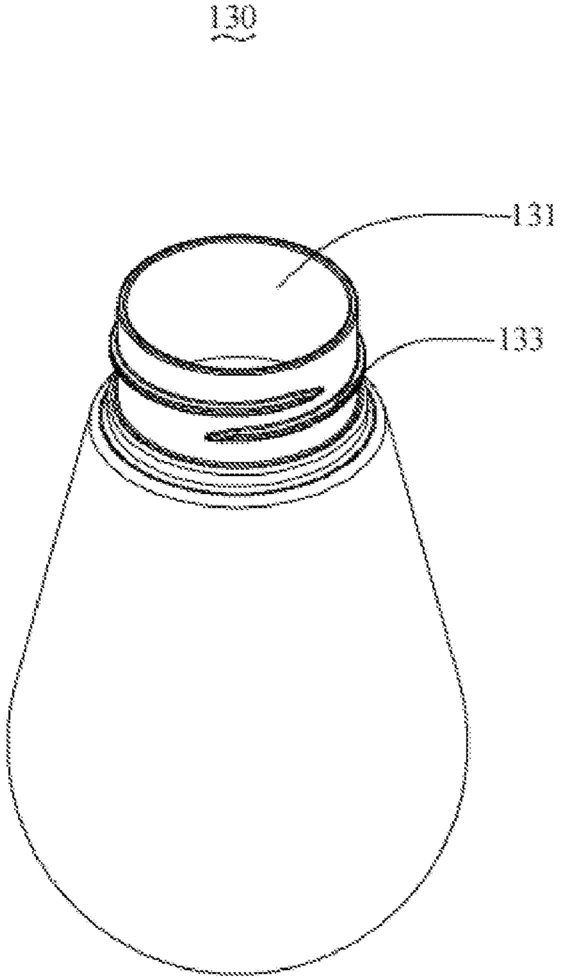
FIG. 6 is a structural schematic diagram of a first lampshade according to the first embodiment of the present disclosure.
Figure 7:
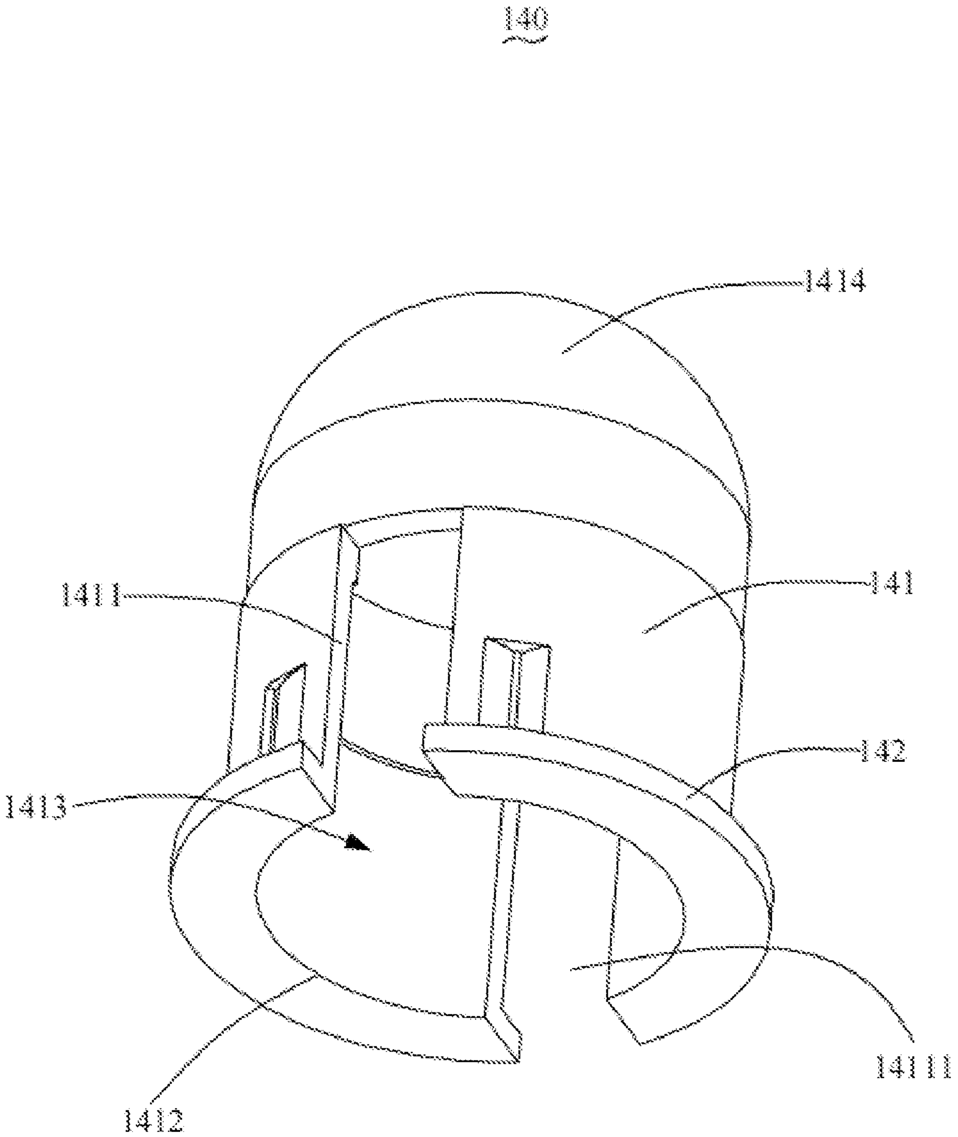
FIG. 7 is a structural schematic diagram of a second lampshade according to the first embodiment of the present disclosure.
Figure 8:
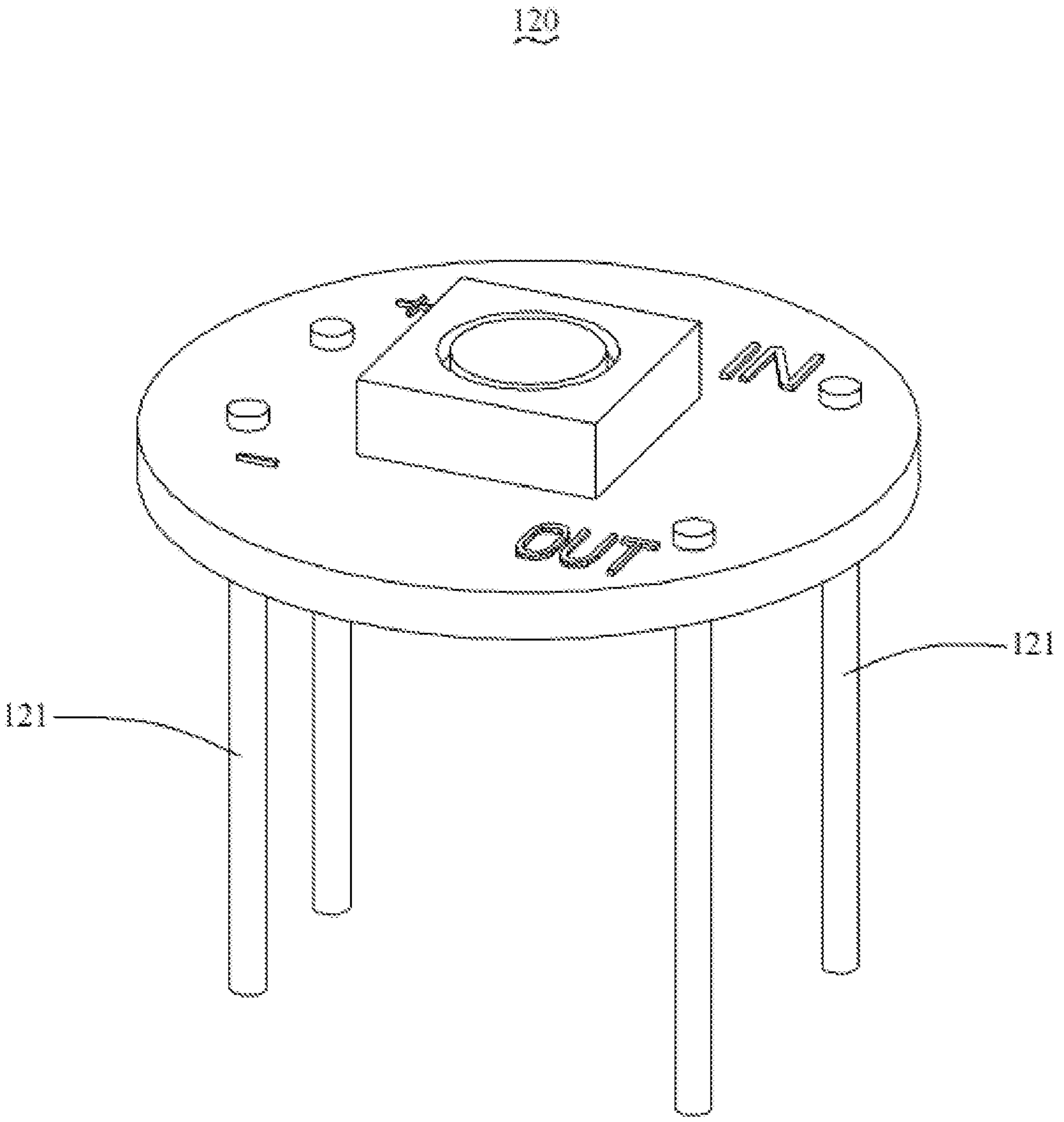
FIG. 8 is a structural schematic diagram of a light-emitting element according to the first embodiment of the present disclosure.
Figure 9A:
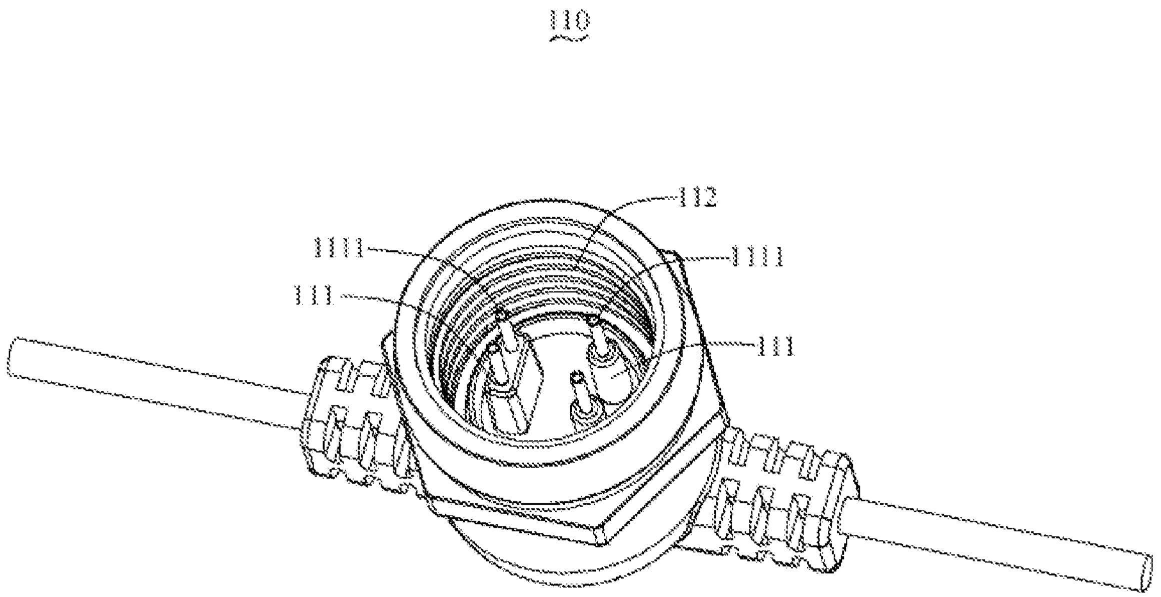
FIG. 9*a* is a structural schematic diagram of a first form of a lamp holder according to the first embodiment of the present disclosure.
Figure 9B:
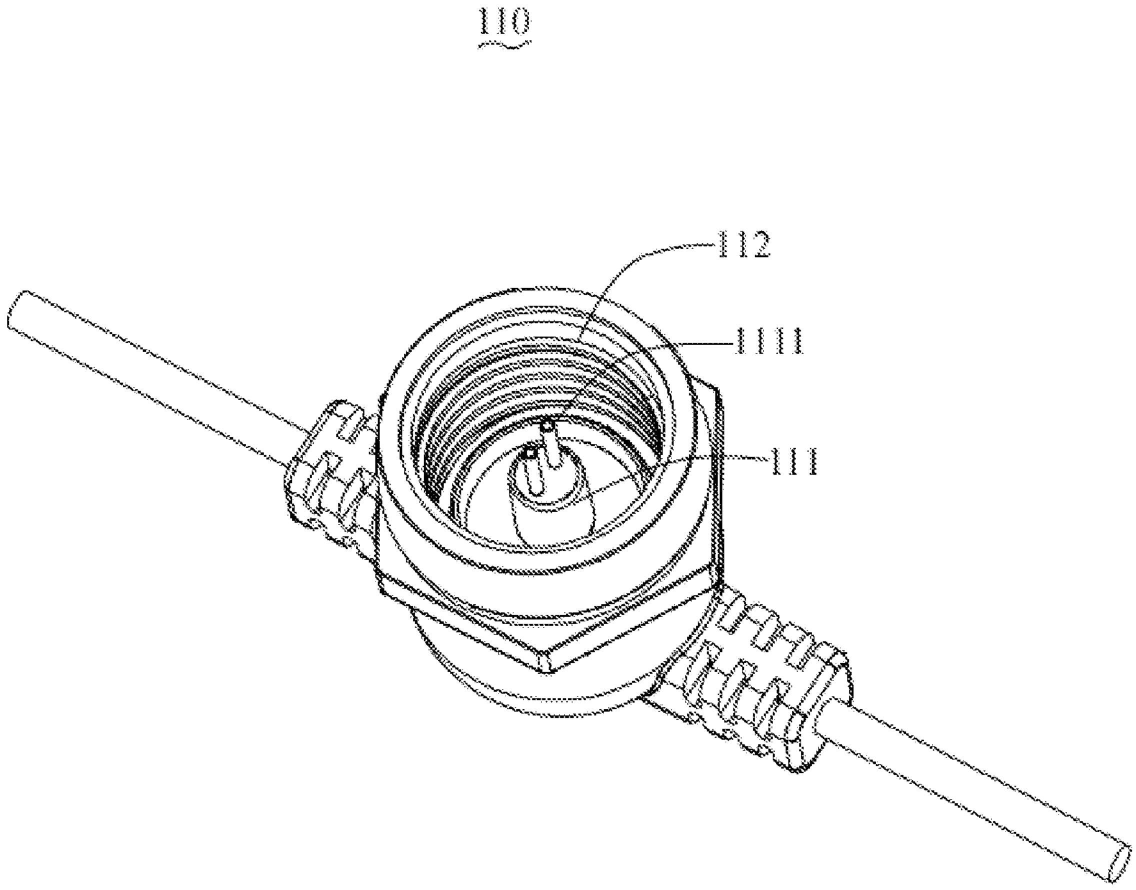
FIG. 9*b* is a structural schematic diagram of a second form of the lamp holder according to the first embodiment of the present disclosure.
Figure 9C:
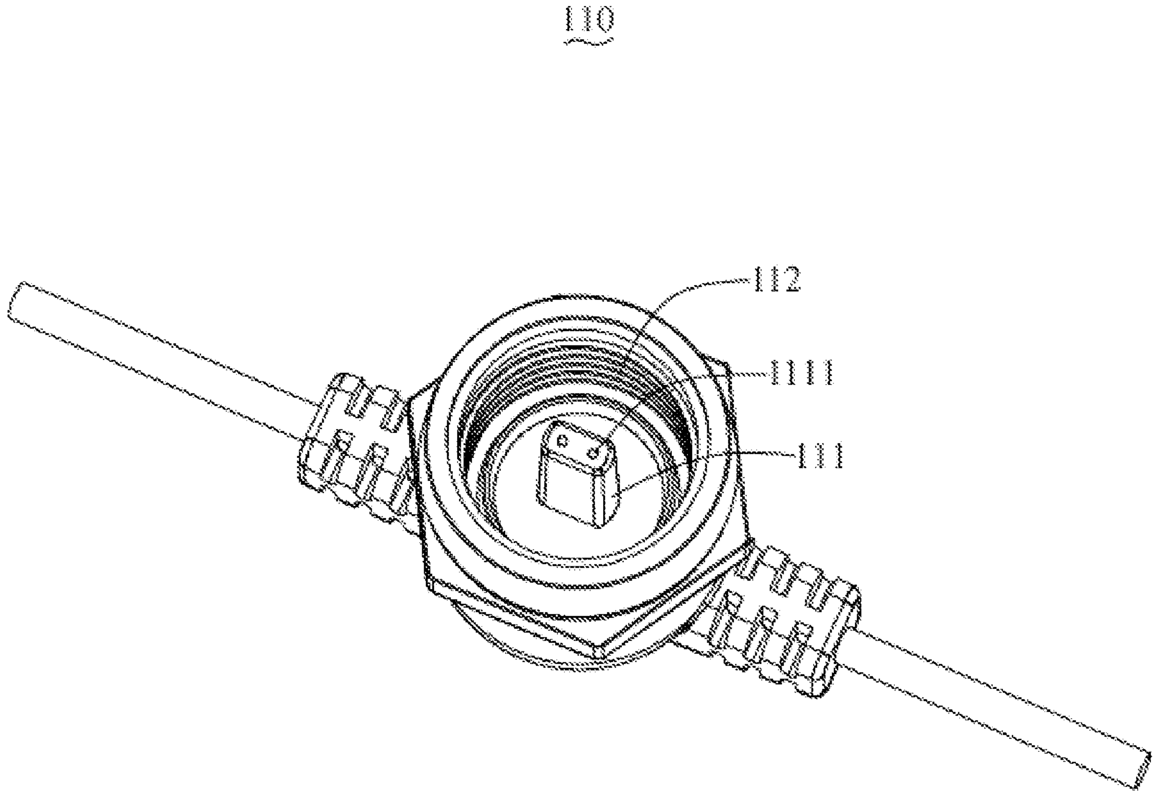
FIG. 9*c* is a structural schematic diagram of a third form of the lamp holder according to the first embodiment of the present disclosure.
Figure 9D:
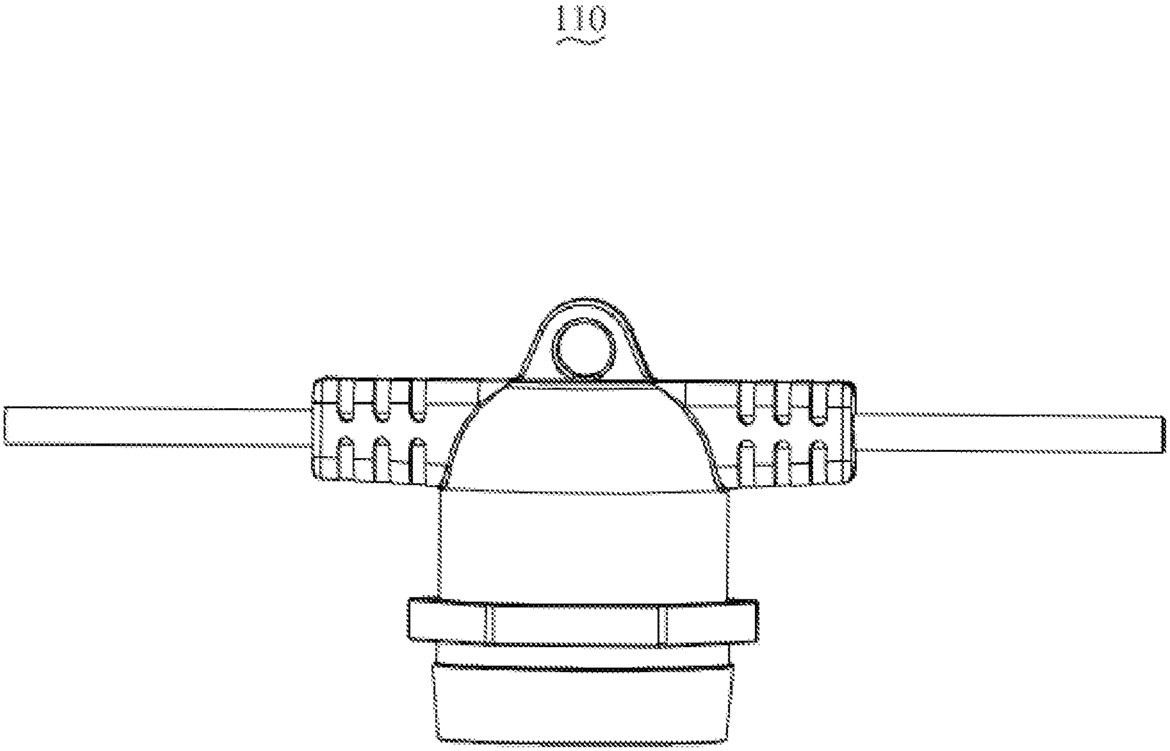
FIG. 9*d* is a structural schematic diagram of a fourth form of the lamp holder according to the first embodiment of the present disclosure.
Figure 9E:
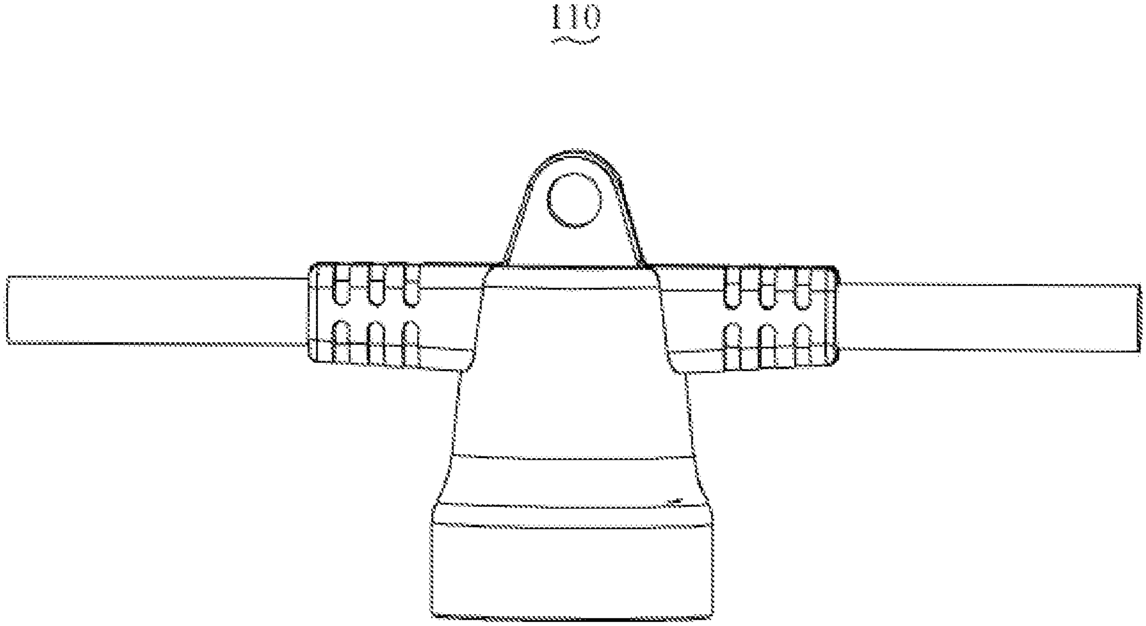
FIG. 9*e* is a structural schematic diagram of a fifth form of the lamp holder according to the first embodiment of the present disclosure.
Figure 9F:
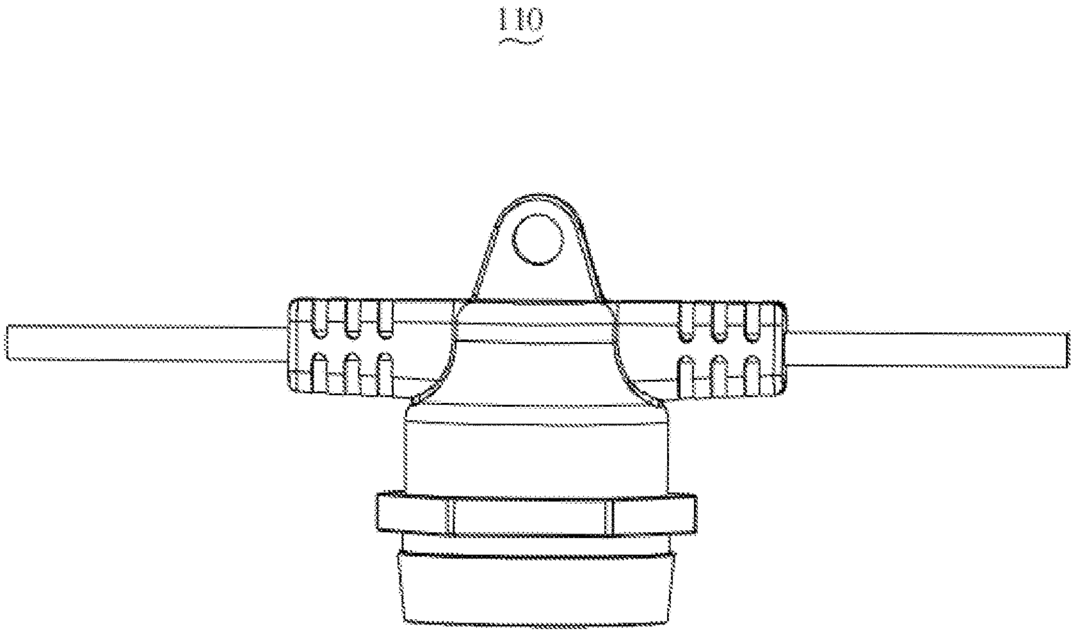
FIG. 9*f* is a structural schematic diagram of a sixth form of the lamp holder according to the first embodiment of the present disclosure.
Figure 9G:
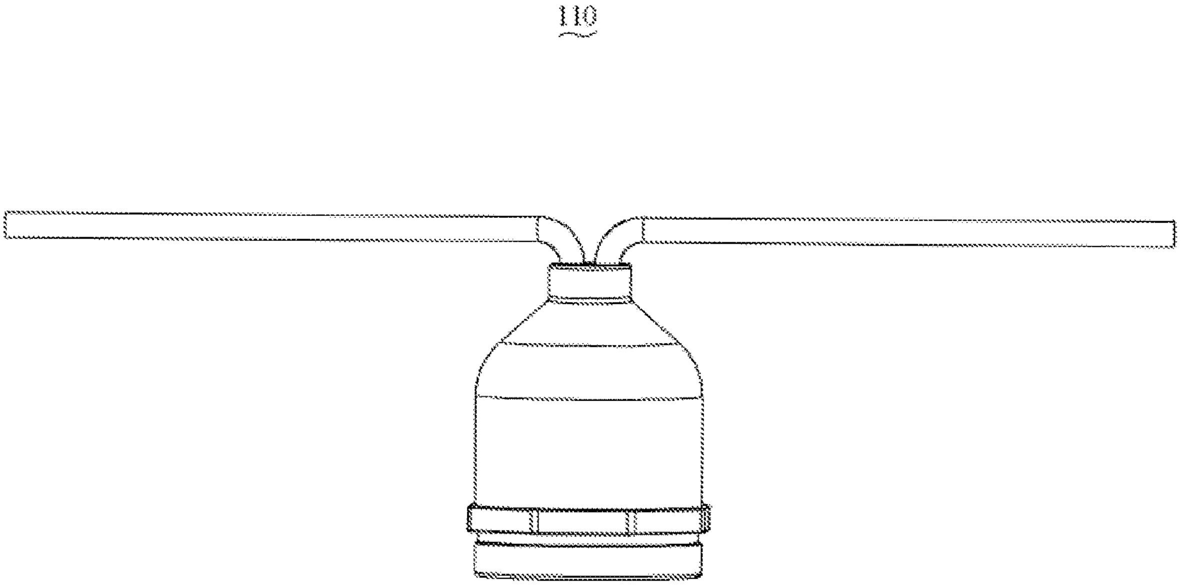
FIG. 9*g* is a structural schematic diagram of a seventh form of the lamp holder according to the first embodiment of the present disclosure.
Figure 9H:
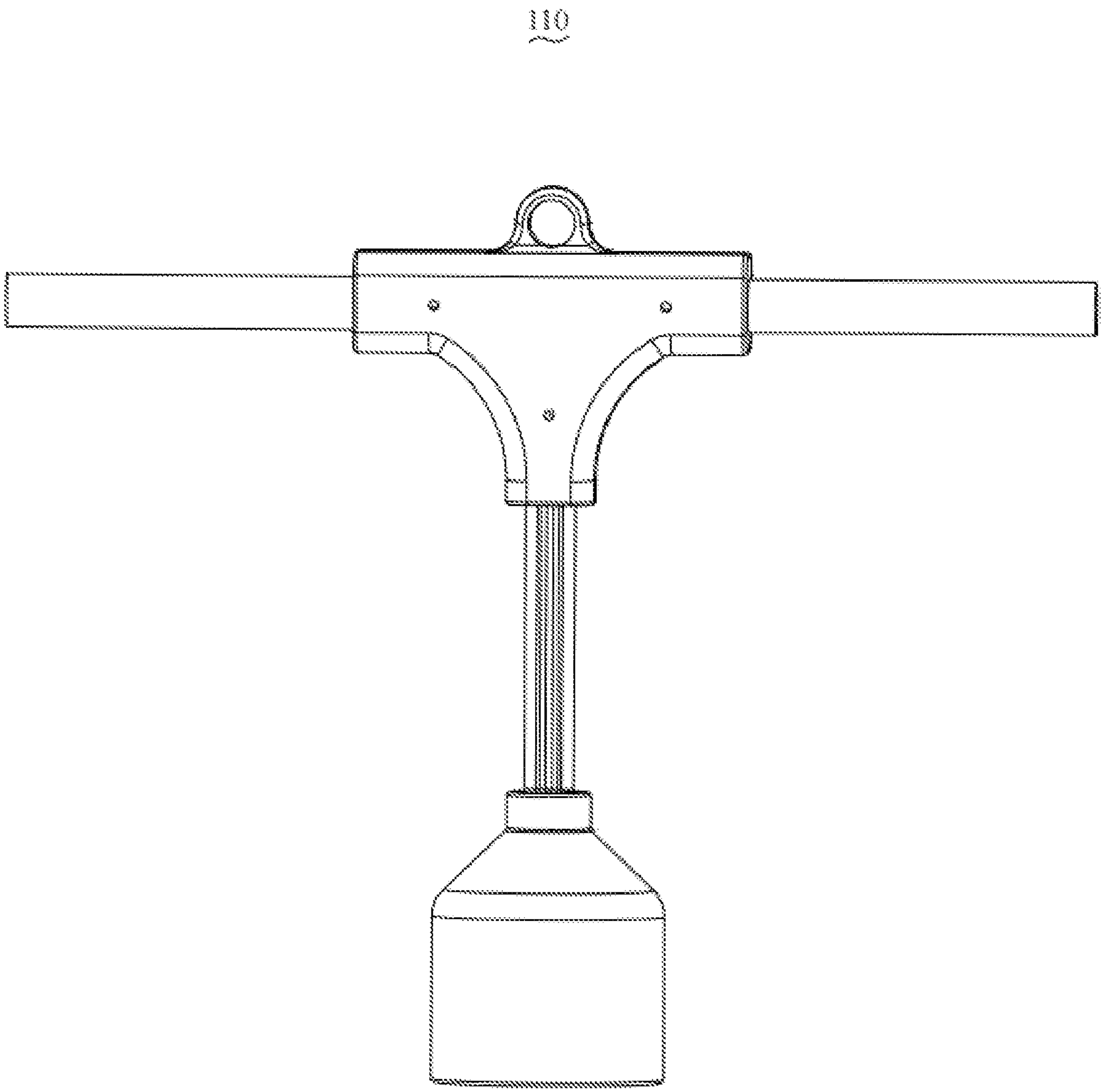
FIG. 9*h* is a structural schematic diagram of an eighth form of the lamp holder according to the first embodiment of the present disclosure.
Figure 9I:
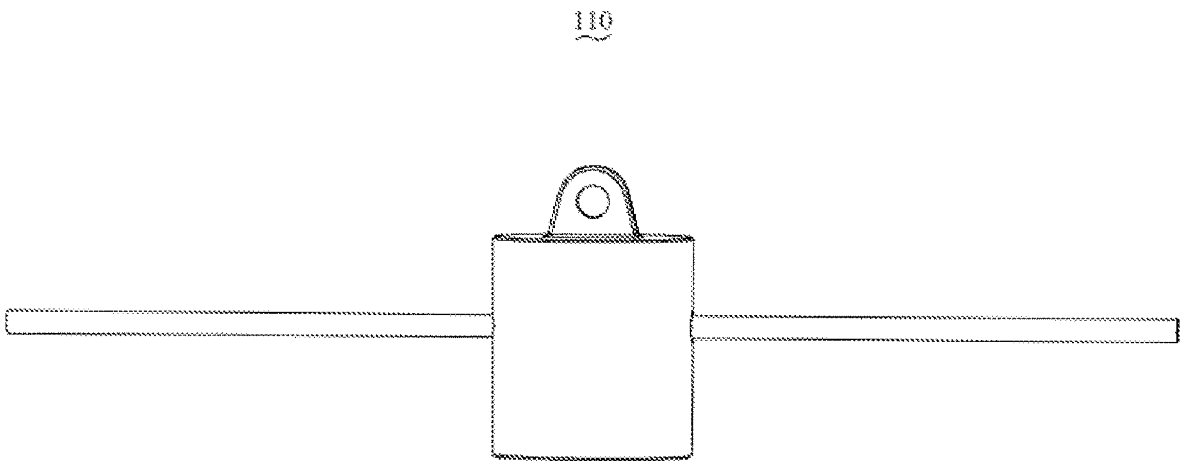
FIG. 9*i* is a structural schematic diagram of a ninth form of the lamp holder according to the first embodiment of the present disclosure.
Figure 9J:
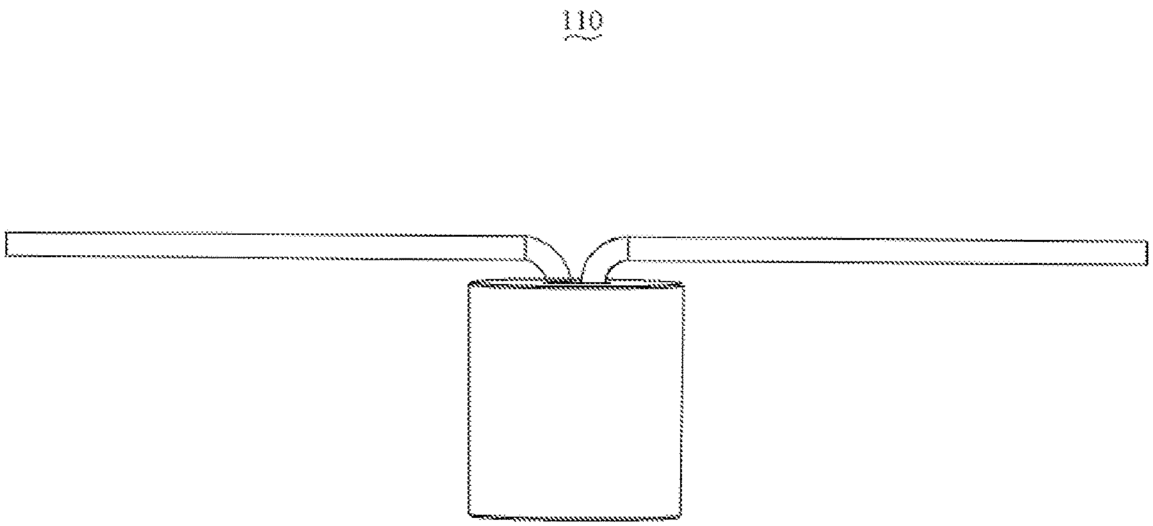
FIG. 9*j* is a structural schematic diagram of a tenth form of the lamp holder according to the first embodiment of the present disclosure.
Figure 10:
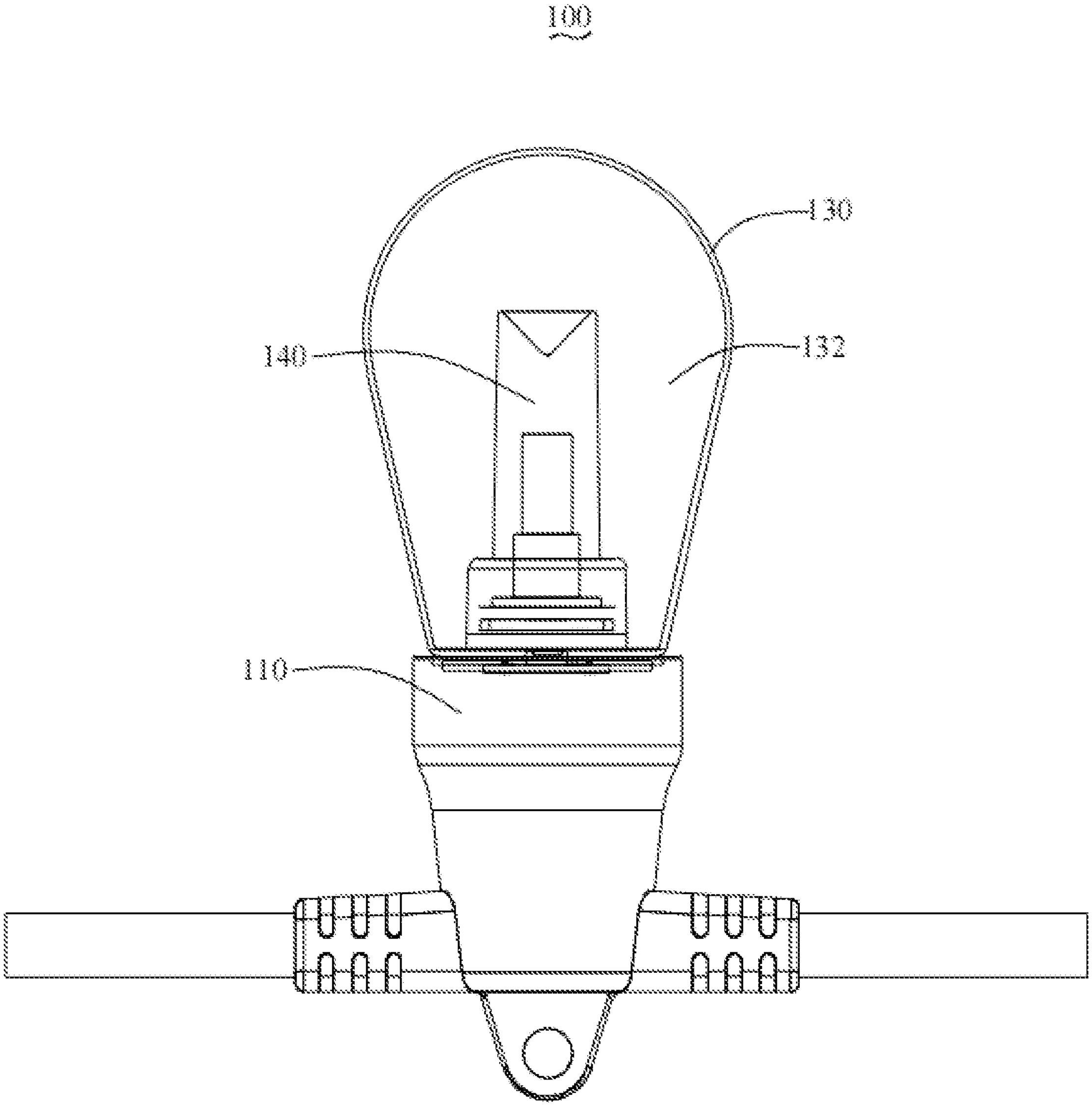
FIG. 10 is a visualizing structural schematic diagram of the lamp head assembly according to a second embodiment of the present disclosure.

In order to facilitate understanding of the present disclosure, the present disclosure is described more fully hereinafter with reference to the accompanying drawings. Preferred embodiments of the present disclosure are given in the accompanying drawings. However, the present disclosure may be implemented in many different forms and is not limited to the embodiments described herein. On the contrary, the purpose of providing these embodiments is to make the understanding of the disclosure of the present disclosure more thorough and comprehensive.

It should be noted that when an element is referred to as being "fixed to" another element, it may be directly on another element or an intervening element may also be present. When an element is considered to be "connected to" another element, it may be directly connected to another element or may have a centering element at the same time. The terms "vertical", "horizontal", "left", "right", etc. used herein are for illustrative purposes only.

Unless otherwise defined, all technical and scientific terms used herein have the same meaning as commonly understood by those who skilled in the art of the present disclosure. The terminology used herein in the specification of the present disclosure is for the purpose of describing particular embodiments only and is not intended to be limiting of the present disclosure. As used herein, the term "and/or" includes any and all combinations of one or more of the associated listed items

First Embodiment

As shown in FIG. 1-8, the present disclosure provides a lamp head assembly 100, including a lamp holder 110, a light-emitting element 120, a first lampshade 130, and a second lampshade 140. A plug interface 111 is disposed on the lamp holder 110 for supplying power, and the light-emitting element 120 is inserted into the plug interface 111. The first lampshade 130 includes a first connecting port 131 and a first accommodation cavity 132, the first connecting port 131 is communicated with the first accommodation cavity 132, the first lampshade 130 is connected to the lamp holder 110 through the first connecting port 131, and the light-emitting element 120 is located in the first accommodation cavity 132. The second lampshade 140 includes an extension body 141 and an abutting portion 142, and the abutting portion 142 is connected to a first side of the extension body 141. The abutting portion 142 abuts against the first connecting port 131, or, the abutting portion 142 abuts against the lamp holder 140. The extension body 141 extends from the abutting portion 142 toward the first accommodation cavity 132, and light of the light-emitting element 120 diffuses toward the first accommodation cavity 132 through the extension body 141. In specific application, the first lampshade 130 is an outer lampshade, the second lampshade 140 is an inner lampshade, the outer lampshade is a transparent plastic lampshade, so that the feature of the extension body of the inner lampshade of a built-in light-emitting body may be presented. In addition, a method of assembling a lamp head is to first insert the light-emitting element 120 into the lamp holder 110 through the plug interface 111, then insert the extension body 141 of the second lampshade 140 into the first accommodation cavity 132 of the first lampshade 130 through the first connecting port 131, after the extension body 141 is inserted by a certain depth, a first side of the abutting portion 142 of the second lampshade 140 is abutted against the first connecting port 131 of the first lampshade 130, and finally, the lamp holder 110 and the first lampshade 130 are assembled and enclosed through the first connecting port 131, so that a second side of the abutting portion 142 is abutted against the lamp holder 110 for conveniently assembling the second lampshade 140 with the lamp holder 110 and the first lampshade 130. In particular, since the abutting portion 142 of the second lampshade 140 is respectively abutted and fixed by the lamp holder 110 and the first lampshade 130, the first lampshade 130, the second lampshade 140, and the lamp holder 110 are good coaxial, which achieves a better lighting effect of the lamps.

In one embodiment, as a lampshade closet to the light-emitting element 130, the second lampshade 140 is directly placed inside the lamp holder 110 and covers a light source. Since the second lampshade 140 includes the abutting portion 142, which is protruded, is in an arc-shaped edge shape, and has an outer diameter greater than an inner diameter of the first connecting port 131, the second lampshade 140 may be assembled with the first lampshade 130 in advance to serve as a built-in component of the first lampshade 130, when assembling the first lampshade 130, the second lampshade 140 directly enters the lamp holder 110 and covers the light-emitting component 120.

In one embodiment, the extension body 141 includes side walls 1411, a second connecting port 1412, and a second accommodation cavity 1413, the side walls 1411 are enclosed to form the second accommodation cavity 1413, the second connecting port 1412 is located at a second side of the extension body 141 and is communicated with the second accommodation cavity 1413, the side walls 1411 abut against the first lampshade 130 through the first connecting port 131, and the light-emitting element 120 enters the second accommodation cavity 1413 through the second connecting port 1412. In specific application, the light emitting element 120 is located in the second accommodation cavity 1413 between the side walls 1311, the light emitted by the light-emitting element 120 passes through the second accommodation cavity 1413, the side walls 1411, and the first accommodation cavity 132 and then diffuses to outside, light of the lamps is softer, and users does not feel dazzling when looking at the lamps, thereby improving user experience.

In one embodiment, heat dissipation grooves 14111 are defined in the side walls 1411 for heat of the light-emitting element 120 to pass through. In specific application, the side walls are cylindrical walls, and the first connecting port 131 of the first lampshade 130 is also a circular port. When the light-emitting element 120 is a high-power element, in order to perform heat dissipation on the light-emitting element 120 in time, the heat dissipation grooves 14111 are defined on the side walls for dissipating the heat of the light-emitting element 12, thereby preventing the light-emitting element 120 from being burnt out at a high temperature, and further preventing the first lampshade 130 from yellowing and blackening in a high-temperature environment for a long time to affect the lighting effect. In addition, it should be understood that when the light-emitting element 120 is a small-power element, the heat dissipation grooves 14111 are not necessary to be defined on the side walls.

In one embodiment, the extension body 141 further includes a top cover 1414, the top cover 1414 is located at the second side of the extension body 141 distal from the second connecting port 1412, and is connected to the side walls 1411. The top cover 1414 and the side walls 1411 form the second accommodation cavity 1413, and the light-emitting element 120 directly faces the top cover 1414. In specific application, in order to prevent the light of the light-emitting element 120 from directly illuminating the outside through an end portion of the extension body 141 to damage eyes of the users, the top cover 1414 of the extension body 141 is located at the first side of the extension body 141 distal from the second connecting port 1412, and is connected to the side walls 1411, meanwhile, the light-emitting element 120 directly faces the top cover 1414, so that lighting effect of the extension body 141 is uniform and attractive.

In one embodiment, a threaded hole 112 is defined in the lamp holder 110, external threads 133 are formed on a portion of the first lampshade 130 close to the first connecting port 131, and the lamp holder 110 is connected to the first lampshade 130 through the external threads 133. In specific application, in order to improve waterproof performance and fastening effect of the lamp head assembly 100, the threaded hole 112 in the lamp holder 100 is fixedly connected to the external threads 133 of the first lampshade 130, thereby improving fastening effect and waterproof performance between the first lampshade 130 and the lamp holder 110.

In one embodiment, the plug interface 111 is disposed in the threaded hole 112, the plug interface 111 includes at least two connecting jacks 1111, the light-emitting element 120 includes connecting pins 121 for matching the at least two connecting jacks 1111. In specific application, threads are disposed in the lamp holder 110 and the plug interface is convexly disposed in the lamp holder 110, the plug interface 111 includes at least two metal connecting jacks 1111, the metal connecting jacks 1111 are communicated with an external power supply for supplying power to the light-emitting element 120. The light emitting element 120 is an LED lamp having the connecting pins 121, thereby saving energy consumption of the lamps. In addition, a number of the connecting pins 121 is set according a number of the connecting jacks 111. It should be noted that a structural form of the lamp holder 110 has various options, as shown in FIGS. 9*a-j*, those who skilled in the art should consider that the change or structural deformation of the inventive effort result should be considered to be the scope of the present disclosure.

Second Embodiment

A structure of the second lampshade provided in the embodiment is different from the structure of the second lampshade in the first embodiment, the difference is specifically as following.

Figure 11:
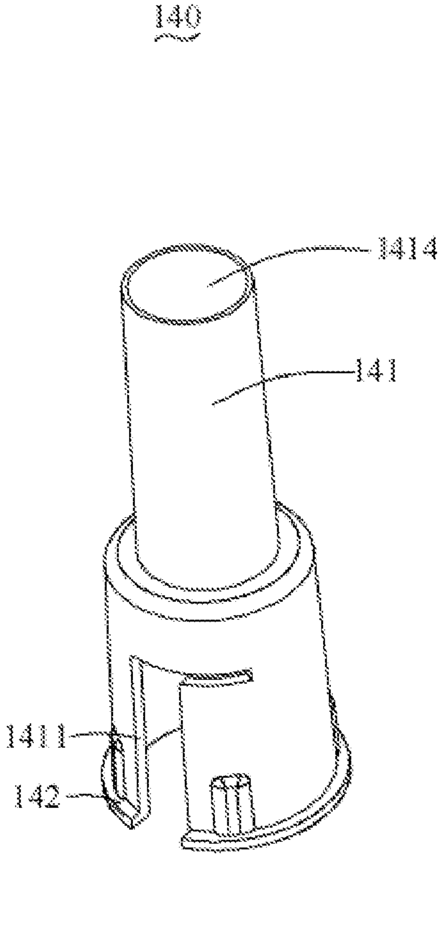
FIG. 11 is a structural schematic diagram of the lamp head assembly according to the second embodiment of the present disclosure.
Figure 12:
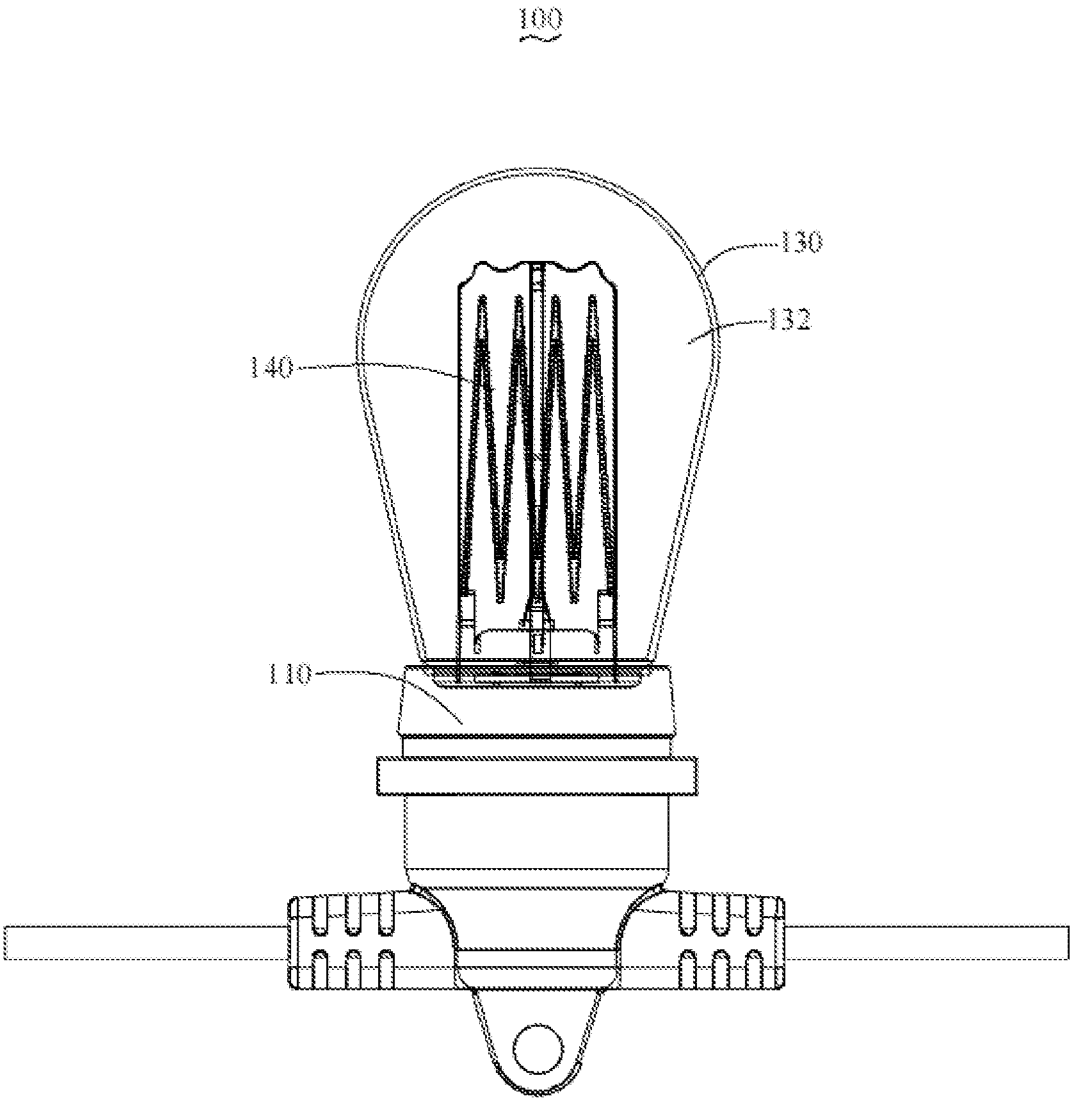
FIG. 12 is a visualizing structural schematic diagram of the lamp head assembly according to a third embodiment of the present disclosure.
Figure 13:
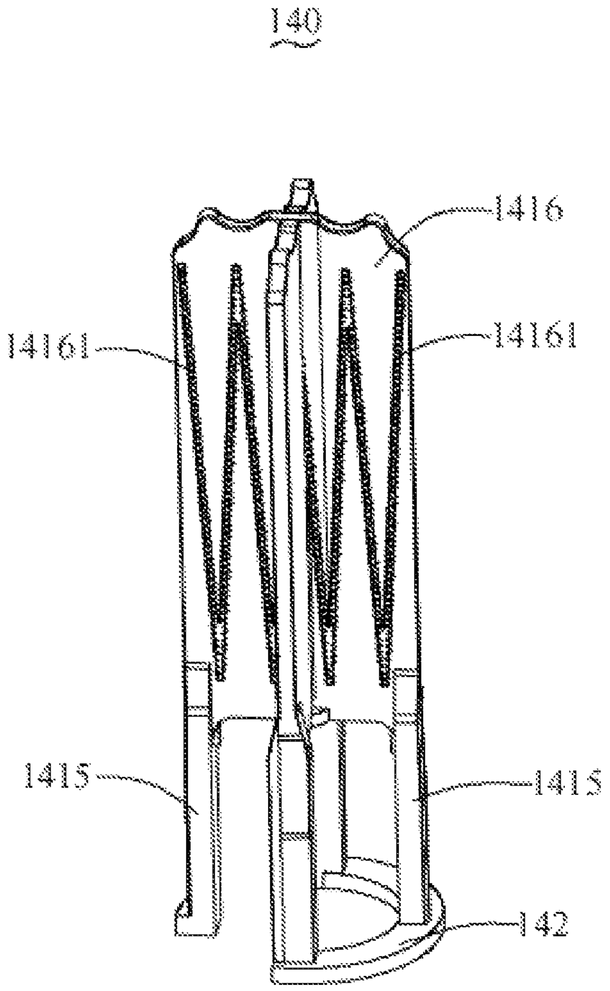
FIG. 13 is a structural schematic diagram of the lamp head assembly according to the third embodiment of the present disclosure Reference numerals in the drawings: 100. lamp head assembly; 110. lamp holder; 111. plug interface; 1111. connecting jack; 112. threaded hole; 120. light-emitting element; 121. connecting pin; 130. first lampshade; 131. first connecting port; 132. first accommodation cavity; 133. external thread; 140. second lampshade; 141. extension body; 1411. side wall; 14111. heat dissipation groove; 1412. second connecting port; 1413. second accommodation cavity; 1414. top cover; 1415. supporting leg; 1416. extension plate; 14161. light guide hole; 142. abutting portion.

As shown in FIGS. 11 and 12, in one embodiment, the top cover 1414 is recessed in the extension body 141 from a direction of the first accommodation cavity 132 toward a direction of the second accommodation cavity 1413. In specific application, in order to further improve an ornamental effect of the extension body 131 when emitting light and improve user experience, the users may replace the top cover 1414 to be concavely disposed at one end of the extension body or convexly disposed at the one end of the extension body.

Third Embodiment

A structure of the second lampshade provided in the embodiment is different from the structure of the second lampshade in the first embodiment, the difference is specifically as following.

As shown in FIGS. 11 and 12, in one embodiment, the extension body 141 includes supporting legs 1415 and extension plates 1416, the supporting legs 1415 are connected to the abutting portion 142 and the extension plates 1416, the light-emitting element 120 abuts against one end of each of the extension plates 1416 close to the supporting legs 1415, and the light of the light-emitting element 120 diffuses toward the first accommodation cavity 132 through the extension plates 1416. In specific application, the second lampshade 140 selected by the users may be the extension body 141 consist of the supporting legs 1415 and the extension plates 1416. The supporting legs 1415 are connected to the abutting portion 142 and the extension plates 1416, the light-emitting element 120 abuts against one end of each of the extension plates 1416 close to the supporting legs 1415. The supporting legs 1415 gradually shrink in a radial direction from a connecting end of the abutting portion 142 to a connecting end of each of the extension plates 1416, which is convenient for the supporting legs 1415 to insert into the first connecting port 131 and abut against an inner wall of the first lampshade 130, so as to conveniently clamp and fix the extension body 141 at the first connecting port 131 of the first lampshade 130.

In one embodiment, a plurality of light guide holes 14161 are defined on each of the extension plates 1416. In specific application, the plurality of the light guide holes 14161 may enable the light irradiated to the extension plates 1416 by the light-emitting element 120 to diverge out a refracted light, thereby improving ornamental effect of the extension plates 1416 when emitting light.

In one embodiment, at least two of the extension plates 1416 are connected to form an included angle. In specific application, in order to further improve ornamental effect of the extension plates 1416, the at least two of the extension plates 1416 penetrate each other to form an included angle to improve the ornamental effect of the extension plates 1416 when emitting the light. As an improvement, the at least two of the extension plates 1416 vertically penetrate each other to form right-angle light-transmitting element to improve the ornamental effect of the extension plates 1416.

The above embodiments only express several embodiments of the present disclosure, and the description thereof is more specific and detailed, but cannot be understood as a limitation on the scope of the present disclosure. It should be noted that, for those who skilled in the art, several variations and improvements may be made without departing from the concept of the present disclosure, and these are all within the scope of protection of the present disclosure. Therefore, the scope of protection of the present disclosure shall be subject to the appended claims.

What is claimed is:

1. A lamp head assembly, comprising:

a lamp holder;

a light-emitting element;

a first lampshade; and a second lampshade;

wherein a plug interface is disposed on the lamp holder for supplying power, and the light-emitting element is inserted into the plug interface; the first lampshade comprises a first connecting port and a first accommodation cavity, the first connecting port is communicated with the first accommodation cavity, the first lampshade is connected to the lamp holder through the first connecting port, and the light-emitting element is located in the first accommodation cavity; the second lampshade comprises an extension body and an abutting portion, and the abutting portion is connected to a first side of the extension body; the abutting portion abuts against the first connecting port, or, the abutting portion abuts against the lamp holder; the extension body extends from the abutting portion toward the first accommodation cavity, and light of the light-emitting element diffuses toward the first accommodation cavity through the extension body;

wherein the extension body comprises supporting legs and extension plates, the supporting legs are connected to the abutting portion and the extension plates, the light-emitting element abuts against one end of each of the extension plates close to the supporting legs, and the light of the light-emitting element diffuses toward the first accommodation cavity through the extension plates.

2. The lamp head assembly according to claim 1, wherein an outer diameter of the abutting portion is greater than an inner diameter of the first connecting port.

3. The lamp head assembly according to claim 1, wherein the extension body comprises side walls, a second connecting port, and a second accommodation cavity, the side walls are enclosed to form the second accommodation cavity, the second connecting port is located at a second side of the extension body and is communicated with the second accommodation cavity, the side walls abut against the first lampshade through the first connecting port, and the light-emitting element enters the second accommodation cavity through the second connecting port.

4. The lamp head assembly according to claim 3, wherein heat dissipation grooves are defined in the side walls for heat of the light-emitting element to pass through.

5. The lamp head assembly according to claim 4, wherein the extension body further comprises a top cover, the top cover is located at the second side of the extension body distal from the second connecting port, and is connected to the side walls; the top cover and the side walls form the second accommodation cavity, and the light-emitting element directly faces the top cover.

6. The lamp head assembly according to claim 5, wherein the top cover is recessed in the extension body from a direction of the first accommodation cavity toward a direction of the second accommodation cavity.

7. The lamp head assembly according to claim 1, wherein a plurality of light guide holes are defined on each of the extension plates, and at least two of the extension plates are connected to form an included angle.

8. The lamp head assembly according to claim 7, wherein a threaded hole is defined in the lamp holder, external threads are formed on a portion of the first lampshade close to the first connecting port, and the lamp holder is connected to the first lampshade through the external threads.

9. The lamp head assembly according to claim 8, wherein the plug interface is disposed in the threaded hole, the plug interface comprises at least two connecting jacks, the light-emitting element comprises connecting pins for matching the at least two connecting jacks.

* * * * *